(12) United States Patent
Strottner

(10) Patent No.: US 10,737,954 B2
(45) Date of Patent: Aug. 11, 2020

(54) WATER TREATMENT SKIMMER APPARATUS AND SYSTEM

(71) Applicant: Rebuild-it Services Group, LLC, Midvale, UT (US)

(72) Inventor: Thomas Strottner, West Jordan, UT (US)

(73) Assignee: REBUILD-IT SERVICES GROUP, LLC, Midvale, UT (US)

( * ) Notice: Subject to any disclaimer, the term of this patent is extended or adjusted under 35 U.S.C. 154(b) by 40 days.

(21) Appl. No.: 16/193,241

(22) Filed: Nov. 16, 2018

(65) Prior Publication Data

US 2019/0152809 A1     May 23, 2019

Related U.S. Application Data

(60) Provisional application No. 62/588,748, filed on Nov. 20, 2017.

(51) Int. Cl.
| | |
|---|---|
| *B01D 21/24* | (2006.01) |
| *C02F 1/40* | (2006.01) |
| *F16C 33/20* | (2006.01) |
| *F16C 17/02* | (2006.01) |
| *B01D 17/02* | (2006.01) |
| *C02F 1/24* | (2006.01) |

(52) U.S. Cl.
CPC ............ *C02F 1/40* (2013.01); *B01D 17/0214* (2013.01); *B01D 21/2438* (2013.01); *F16C 17/02* (2013.01); *F16C 33/20* (2013.01); *F16C 33/205* (2013.01); *C02F 1/24* (2013.01); *C02F 2201/002* (2013.01)

(58) Field of Classification Search
CPC ............ B01D 21/2433; B01D 21/2438; B01D 17/0214; F16C 17/02; F16C 33/20; F16C 33/201; F16C 33/205
USPC .......................................... 210/523, 525, 540
See application file for complete search history.

(56) References Cited

U.S. PATENT DOCUMENTS

| | | | | |
|---|---|---|---|---|
| 2,307,154 | A | * | 1/1943 | Osuna ................. B01D 21/2433 210/525 |
| 2,651,615 | A | * | 9/1953 | Kelly .................. B01D 21/2438 210/525 |
| 2,776,175 | A | * | 1/1957 | Waite ....................... F16C 33/20 384/294 |
| 2,780,361 | A | * | 2/1957 | Evans ................. B01D 21/2433 210/525 |
| 3,008,779 | A | * | 11/1961 | Spriggs .................... F16C 33/20 384/299 |
| 3,465,887 | A | * | 9/1969 | Cookney ............ B01D 21/2433 210/525 |

(Continued)

*Primary Examiner* — Christopher Upton
(74) *Attorney, Agent, or Firm* — Snell & Wilmer L.L.P.

(57) ABSTRACT

A connection collar for a water treatment skimmer apparatus includes a body comprising a first material and defining a first circular hole and a bushing comprising a second material disposed within the first circular hole, the bushing defining a second circular hole. The first material is different than the second material and the first circular hole circumscribes and is concentric with the second circular hole, according to various embodiments. The water treatment skimmer apparatus may include a support bar, the connection collar rotatably coupled to the support bar, and a skimmer blade coupled to the connection collar.

12 Claims, 3 Drawing Sheets

(56) References Cited

U.S. PATENT DOCUMENTS 4,364,834 A * 12/1982 Wawro ............... B01D 21/2433
  210/525
5,607,249 A *  3/1997 Maughan .............. F16C 33/201
  403/120

* cited by examiner

WATER TREATMENT SKIMMER APPARATUS AND SYSTEM

CROSS-REFERENCE TO RELATED APPLICATION

This application claims the benefit of and priority to U.S. provisional patent application Ser. No. 62/588,748, filed Nov. 20, 2017 entitled "WATER TREATMENT SKIMMER APPARATUS AND SYSTEM," the contents of which are incorporated herein by reference in its entirety.

FIELD

The present disclosure relates to water treatment systems, and more specifically to water skimmer devices.

BACKGROUND

Water treatment systems generally include a skimmer mechanism that facilitates the collection of material floating on the surface of water. Conventional water skimmer mechanisms are configured to pass a skimmer blade across the surface of the water to pull floating material to a collection area, which is referred to as a "scum box" or a "scum beach." Most conventional skimmer mechanisms have various shortcomings pertaining to adjustability of the height/elevation of the skimmer blade and pertaining to corrosion resistance. For example, metal-on-metal interface between components of conventional skimmer mechanisms, at least after a period of use, are susceptible to corrosion and/or restrict relative movement between said components.

SUMMARY

In various embodiments, the present disclosure provides a connection collar for a water treatment skimmer apparatus. The connection collar may include a body comprising a first material and defining a first circular hole and a bushing comprising a second material disposed within the first circular hole, the bushing defining a second circular hole. The first material is different than the second material and the first circular hole circumscribes and is concentric with the second circular hole, according to various embodiments.

In various embodiments, the first material of the body has a metallic material and the second material of the bushing comprises a polymeric material. In various embodiments, the polymeric material is nylon-based. For example, the polymeric material may be molybdenum nylon. In various embodiments, the connection collar is a clevis.

Also disclosed herein, according to various embodiments, is a water treatment skimmer apparatus that includes a support bar, a connection collar rotatably coupled to the support bar, and a skimmer blade coupled to the connection collar. The connection collar may include a body comprising a first material and defining a first circular hole and the bushing may include. The connection collar may also include a bushing comprising a second material disposed within the first circular hole, the bushing defining a second circular hole. The first material may be different than the second material, the first circular hole may circumscribe and may be concentric with the second circular hole, and the support bar may extend through the second circular hole.

In various embodiments, the connection collar is a first connection collar, and the water treatment skimmer apparatus further includes a second connection collar rotatably coupled to the support bar. The skimmer blade may be coupled to the first connection collar and the second connection collar. In various embodiments, the apparatus further includes a first connecting arm extending between the first connection collar and the skimmer blade and a second connecting arm extending between the second connection collar and the skimmer blade. Still further, the water treatment skimmer apparatus may include a stop bar configured to limit rotation of the first connection collar and the second connection collar about the support bar. The stop bar, according to various embodiments, extends parallel to the support bar and extends between the first connection collar and the second connection collar. The apparatus may further include a first fixed collar non-rotatably coupled to the support bar and a second fixed collar non-rotatably coupled to the support bar. In various embodiments, the first fixed collar and the second fixed collar are disposed between the first connection collar and the second connection collar, the first fixed collar is disposed adjacent the first connection collar, the second fixed collar is disposed adjacent the second connection collar, and engagement between the stop bar and the first and second fixed collars limits rotation of the first and second connection collars about the support bar.

Also disclosed herein, according to various embodiments, is a water treatment system. The water treatment system may include a water tank, a scum box comprising a ramp portion and a collection opening, a skimmer support arm configured to move around a radially outward portion of the water tank; and a water treatment skimmer apparatus coupled to the skimmer support arm. The water treatment skimmer apparatus may include a connection collar rotatably coupled to the support bar and a skimmer blade coupled to the connection collar.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
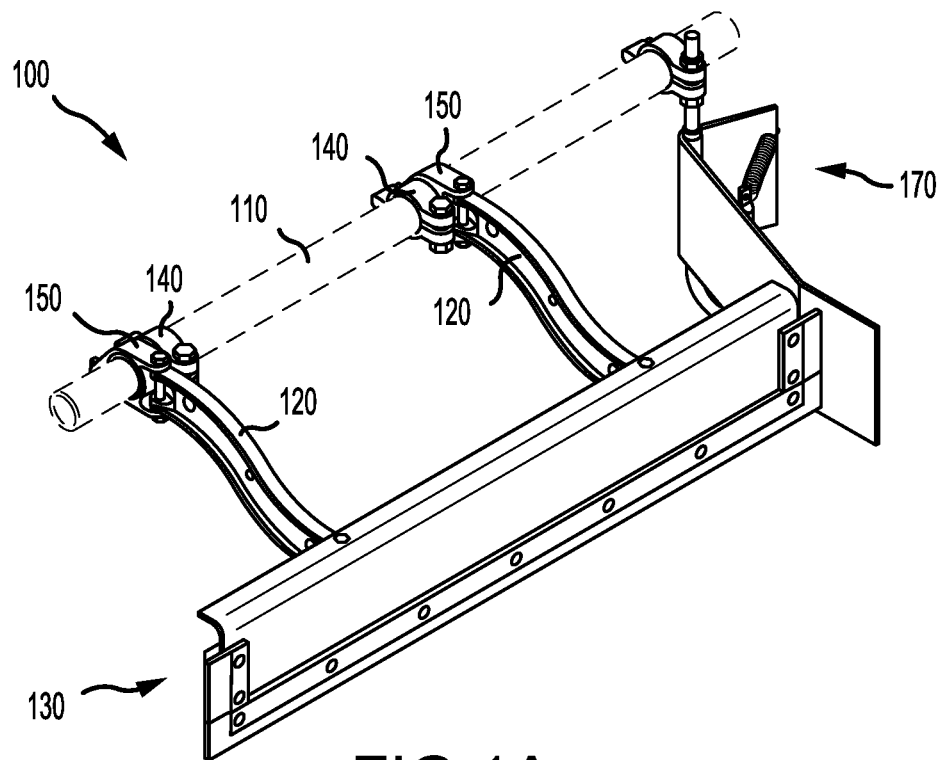
FIG. 1A is a perspective view of a water treatment skimmer apparatus, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 2:
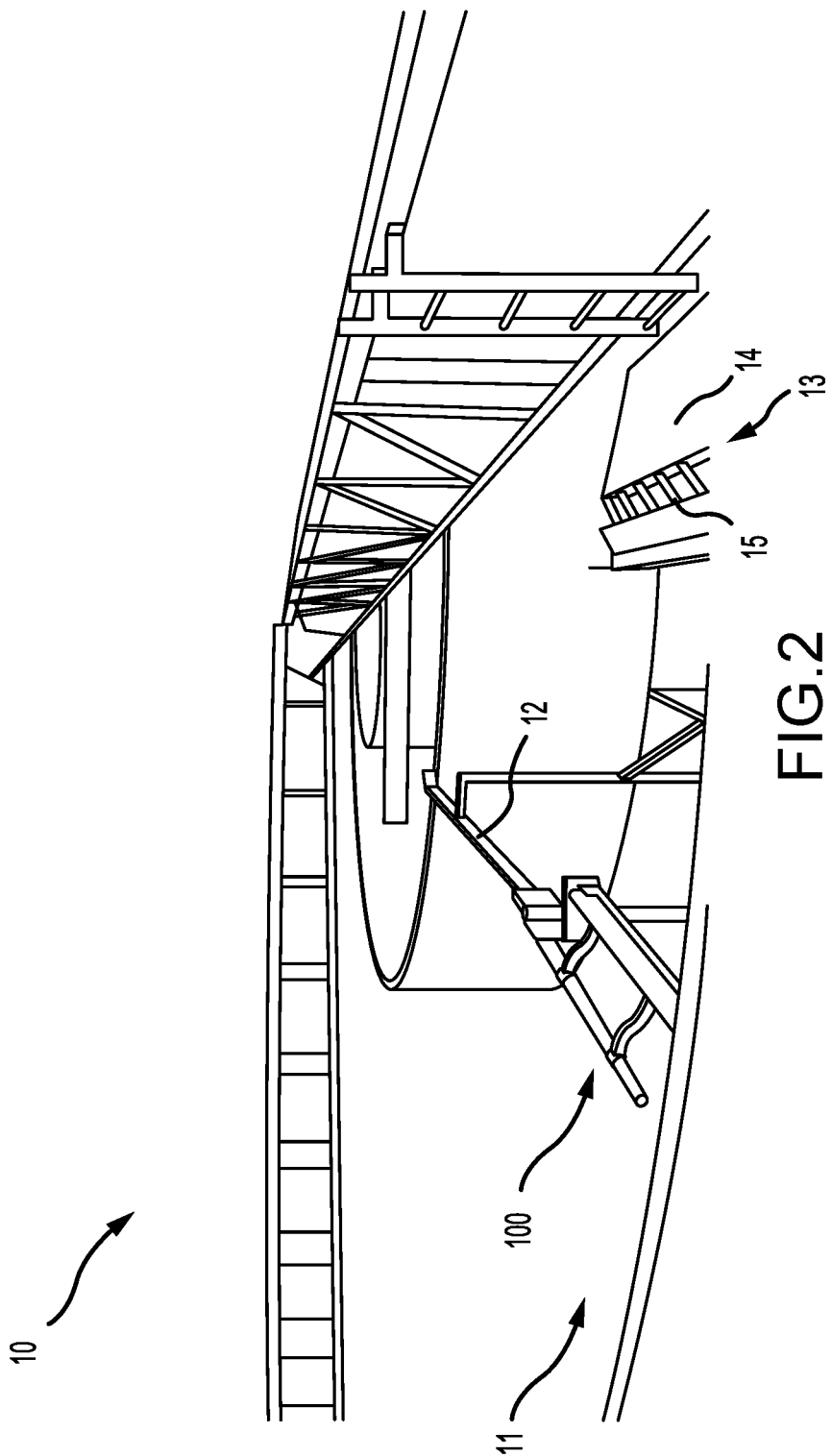
FIG. 2 is a photograph of a water treatment skimmer system, in accordance with various embodiments.

In various embodiments and with reference to FIGS. 1A and 2, water treatment system 10 having a water treatment apparatus 100 is provided. The water treatment system 10 is generally configured to clean, filter, settle, disinfect, or otherwise treat water to make it more acceptable for a specific end-use (e.g., human consumption), according to various embodiments. In various embodiments, the water treatment system 10 includes a circular water tank 11 and a water treatment skimmer apparatus 100, also referred to herein as the "apparatus" 100 or the "skimmer mechanism" 100. The water treatment skimmer apparatus 100 is supported by a skimmer support arm 12 and is configured to move around a radially outward portion of the circular water tank 11, according to various embodiments. In various embodiments, and with continued reference to FIGS. 1A and 2, material floating on the surface of the water contained in the water tank 11 may be pulled by a skimmer blade 130 of the skimmer mechanism 100 as the skimmer mechanism 100 moves around the circular water tank 11. The water treatment system 10 may include one or more collection areas, known as a "scum beach" 13 or a "scum box" 13, and the skimmer mechanism 100 may be configured to deposit the floating material pulled by the skimmer blade 130 into the scum box 13.

In various embodiments, the scum box 13 includes a ramp portion 14 that includes an inclined surface extending from beneath the surface of the water to above the surface of the water. As the skimmer mechanism 100 is moved around the radially outward portion of the water tank 11, the skimmer blade 130 of the skimmer mechanism 100 rides up the ramp portion 14, pulling the floating material out of the water and into a collection opening 15. As described in greater detail below, the change in height/elevation of the skimmer blade 130 as it rides along and up the ramp portion 14 of the scum beach 13 is facilitated and enabled by a connection collar 150 of the skimmer mechanism 100. That is, connection collar 150 of the skimmer blade 130 may be configured to hinge or pivot to enable the described height change.

Figure 1B:
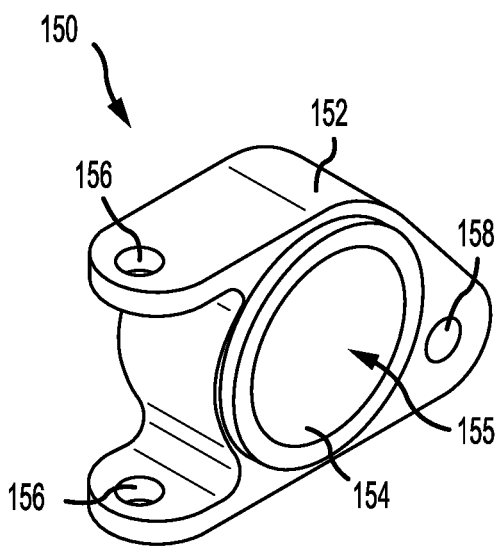
FIG. 1B is a perspective view of a connection collar of a water treatment skimmer apparatus, in accordance with various embodiments.
Figure 1C:
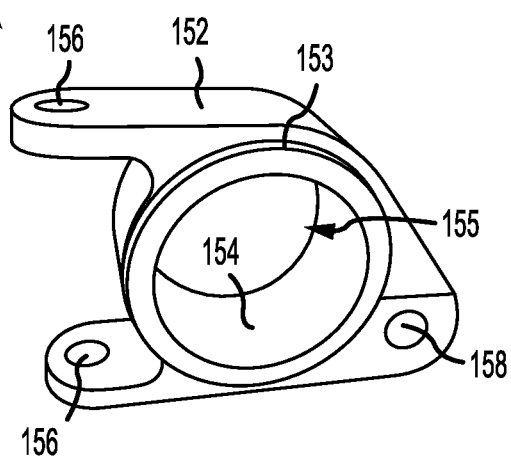
FIG. 1C is a photograph of a connection collar of a water treatment skimmer apparatus, in accordance with various embodiments.

In various embodiments, and with reference to FIGS. 1A, 1B, and 1C, the connection collar 150, which may be a clevis or other such component, is rotatably coupled to a support bar 110 of the skimmer mechanism 100 and the skimmer blade 130 is thus rotatably connected to the support bar 110 via the connection collar 150. The support bar 110 may be a section of the support arm 12 or may be connected to the support arm 12 of the water treatment system 10. A connecting arm 120 may extend between the connection collar 150 and the skimmer blade 130. In various embodiments, the skimmer blade 130 may be connected to the support bar 110 via multiple connection collars 150 and connecting arms 120. The one or more connection collars 150 include a body 152 and a bushing 154, according to various embodiments. The body 152 is made from a first material and defines a first circular hole 153 within which the bushing 154 is disposed. The bushing 154 is made from a second material that is different than the first material and defines a corresponding second circular hole 155. That is, the first and second circular holes 153, 155 are coaxial and the first circular hole 153 circumscribes and is concentric with the second circular hole 155, according to various embodiments.

In various embodiments, the support bar 110 extends through the second circular hole 155. The bushing 154 of the connection collar 150 enables relative rotation between the support bar 110 and the housing 152, according to various embodiments. That is, the connection collar 150 enables the skimmer blade 130 to be able to pivot upward in response to engaging the ramp portion 14 of the scum beach 13 and enables the skimmer blade 130 to fall back down again after passing over the scum beach 13.

In various embodiments, the bushing 154 is a coating applied to a radially inward surface of the first circular hole 153 defined in the body 152. In various embodiments, the bushing 154 is not only made from a material that is different than the material of the body 152, but is also different than the material of the support bar 110. For example, the body 152 and/or the support bar 110 may be made from a metal or a metallic material and the bushing 154 may be made from a plastic, polymeric, or composite material, among others. In various embodiments, the bushing 154 is made from a nylon-based material. In various embodiments, the bushing 154 is made from molybdenum nylon. In various embodiments, the bushing 154 is made from resin coated carbon fiber, ultra-high molecular polyethylene, tungsten disulfide nylon, hex-boron nitride nylon, sinister bronze, or high-density polyethylene, among others. In various embodiments, the connection collar 150 enables the aforementioned relative rotation/pivoting movement, but the connection collar 150 may also provide corrosion resistance by eliminating a metal-on-metal interface that would have existed in a conventional system.

Figure 3A:
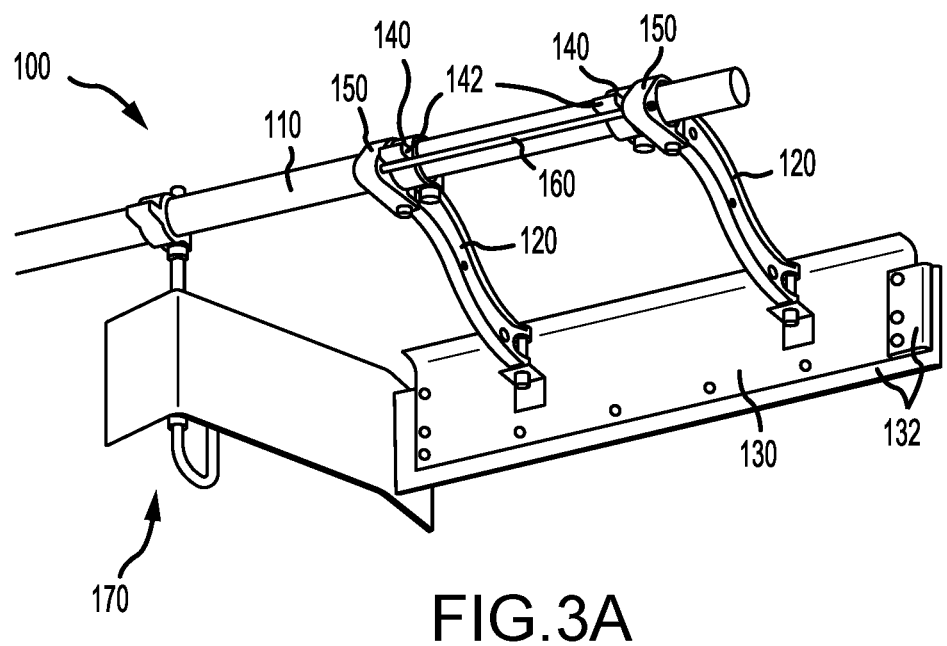
FIG. 3A is a perspective view of a water treatment skimmer apparatus, in accordance with various embodiments.
Figure 3B:
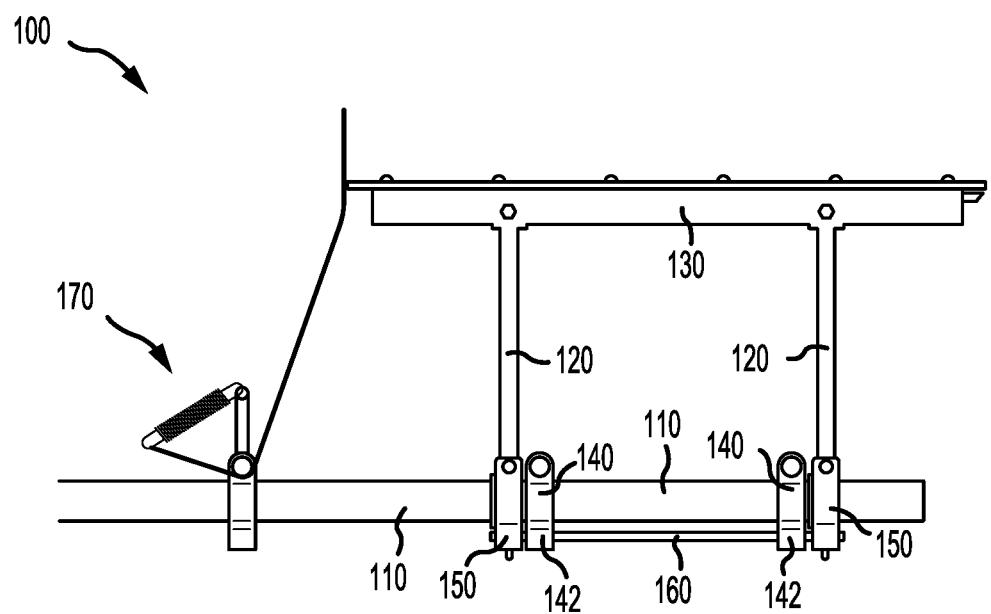
FIG. 3B is a perspective view of a water treatment skimmer apparatus, in accordance with various embodiments.

In various embodiments, as mentioned above and with reference to FIGS. 1A, 3A, and 3B, the skimmer blade 130 is rotatably connected to the support bar 110 via a pair of connecting arms 120 and a pair of connection collars 150. The skimmer blade 130 may include one or more attachments 132 that that facilitate the collection of floating material and/or that facilitate sliding engagement with the outer wall of the tank 11 and/or with the scum beach 13. With momentary reference to FIGS. 1B and 1C, the connecting arms 120 may be coupled to the connection collar 150 via clevis points 156. In various embodiments, the skimmer mechanism 100 may further include a stop bar 160 configured to limit rotation of the first and second connection collars 150 about the support bar 110. For example, the stop bar 160 may extend parallel to the support bar 110 between the two connection collars 150. The skimmer mechanism 100 may include one or more fixed collars 140 non-rotatably fixed/mounted to the support bar 110. Engagement between the stop bar 160 and the one or more fixed collars 140 may limit the rotation of the first and second connection collars 150 and thus may limit the pivoting action of the skimmer blade 130. For example, the one or more fixed collars 140 may have a ledge 142 that protrudes to engage the stop bar 160. In various embodiments, a pair of fixed collars 140 are disposed between the pair of connection collars 150. For example, one of the fixed collars 140 may be disposed adjacent one of the connection collars 150 and the other fixed collar 140 may be disposed adjacent the other connection collar 150. In various embodiments, the stop bar 160 is configured to limit downward movement of the skimmer blade 130.

In various embodiments, the skimmer mechanism 100 may include a spring/hinged mechanism 170. Mechanism 170 is used to place pressure against the skimmer mechanism 100 to ensure that it remains in contact with the tank baffle plate. In various embodiments, a spring is located between the collar 140 and the connecting arm 120, and the spring is orientated so that it applies force against the baffle. A spring may be used in conjunction with or in place of mechanism 170.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A water treatment skimmer apparatus comprising:
    a support bar;
    a connection collar rotatably coupled to the support bar; and
    a skimmer blade coupled to the connection collar;
    wherein the connection collar comprises:
        a body comprising a first material and defining a first circular hole; and
        a bushing comprising a second material disposed within the first circular hole, the bushing defining a second circular hole;
    wherein:
        the first material is different than the second material;
        the first circular hole circumscribes and is concentric with the second circular hole; and
        the support bar extends through the second circular hole.

2. The water treatment skimmer apparatus of claim 1, wherein:
    the connection collar is a first connection collar;
    the water treatment skimmer apparatus further comprises a second connection collar rotatably coupled to the support bar; and
    the skimmer blade is coupled to the first connection collar and the second connection collar.

3. The water treatment skimmer apparatus of claim 2, further comprising a first connecting arm extending between the first connection collar and the skimmer blade and a second connecting arm extending between the second connection collar and the skimmer blade.

4. The water treatment skimmer apparatus of claim 3, further comprising a stop bar configured to limit rotation of the first connection collar and the second connection collar about the support bar.

5. The water treatment skimmer apparatus of claim 4, wherein the stop bar extends parallel to the support bar and extends between the first connection collar and the second connection collar.

6. The water treatment skimmer apparatus of claim 5, further comprising a first fixed collar non-rotatably coupled to the support bar and a second fixed collar non-rotatably coupled to the support bar, wherein:
    the first fixed collar and the second fixed collar are disposed between the first connection collar and the second connection collar;

the first fixed collar is disposed adjacent the first connection collar;

the second fixed collar is disposed adjacent the second connection collar; and engagement between the stop bar and the first and second fixed collars limits rotation of the first and second connection collars about the support bar.

7. A water treatment system comprising:

a water tank;

a scum box comprising a ramp portion and a collection opening;

a skimmer support arm configured to move around a radially outward portion of the water tank; and a water treatment skimmer apparatus coupled to the skimmer support arm, the water treatment skimmer apparatus comprising:

a support bar;

a connection collar rotatably coupled to the support bar; and a skimmer blade coupled to the connection collars;

wherein the connection collar comprises:

a body comprising a first material and defining a first circular hole; and a bushing comprising a second material disposed within the first circular hole, the bushing defining a second circular hole; wherein:

the first material is different than the second material;

the first circular hole circumscribes and is concentric with the second circular hole; and the support bar extends through the second circular hole.

8. The water treatment system of claim 7, wherein:

the connection collar is a first connection collar;

the water treatment skimmer apparatus further comprises a second connection collar rotatably coupled to the support bar; and the skimmer blade is coupled to the first connection collar and the second connection collar.

9. The water treatment system of claim 8, further comprising a first connecting arm extending between the first connection collar and the skimmer blade and a second connecting arm extending between the second connection collar and the skimmer blade.

10. The water treatment system of claim 9, further comprising a stop bar configured to limit rotation of the first connection collar and the second connection collar about the support bar.

11. The water treatment system of claim 10, wherein the stop bar extends parallel to the support bar and extends between the first connection collar and the second connection collar.

12. The water treatment system of claim 11, further comprising a first fixed collar non-rotatably coupled to the support bar and a second fixed collar non-rotatably coupled to the support bar, wherein:

the first fixed collar and the second fixed collar are disposed between the first connection collar and the second connection collar;

the first fixed collar is disposed adjacent the first connection collar;

the second fixed collar is disposed adjacent the second connection collar; and engagement between the stop bar and the first and second fixed collars limits rotation of the first and second connection collars about the support bar.

* * * * *